3,360,579
CATALYTIC DEHYDROGENATION OF ALKYLAROMATICS
Gerald J. Hills, San Mateo, and Roy C. Siem, Concord, Calif., assignors to Shell Oil Company, New York, N.Y., a corporation of Delaware
Filed May 21, 1965, Ser. No. 457,608
10 Claims. (Cl. 260—669)

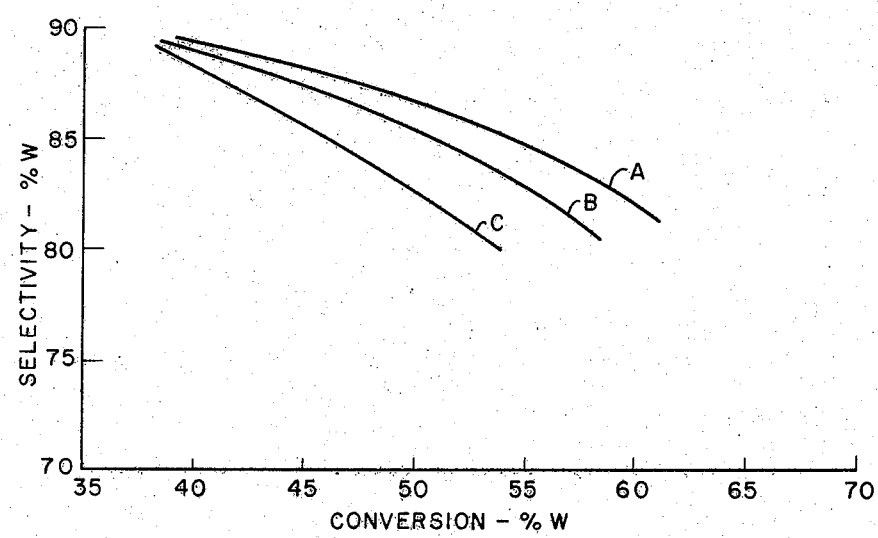
FIG. I
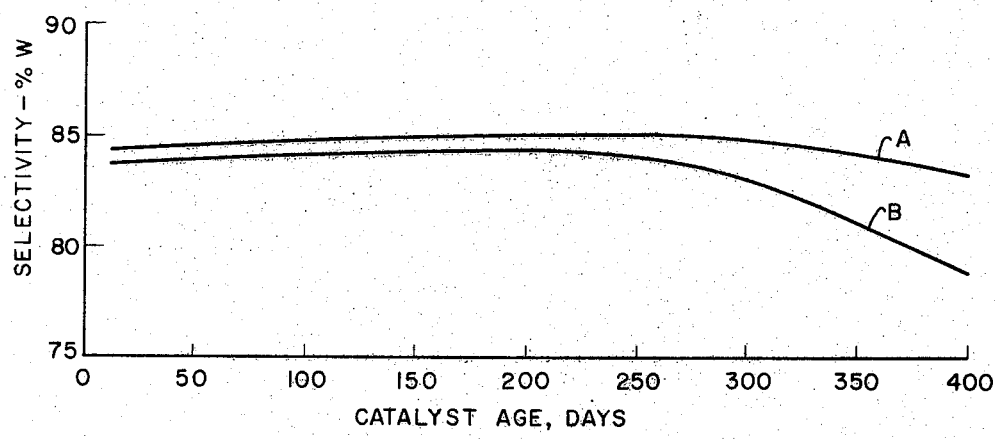
FIG. II
INVENTORS:
GERALD J. HILLS
ROY C. SIEM
BY: *John H. Colvin*
THEIR ATTORNEY United States Patent Office 3,360,579
Patented Dec. 26, 1967

ABSTRACT OF THE DISCLOSURE

A catalyst particularly effective in the dehydrogenation of ethyl benzene to styrene obtained by calcining a mixture of mono-hydrated yellow iron oxide, chromium oxide, potassium carbonate and water.

---

This invention relates to an improved process for the catalytic dehydrogenation of lower alkyl aromatic hydrocarbons at high temperatures and in the presence of steam. More particularly this invention relates to an improved process for the preparation of mono- or di-vinyl benzenes by the catalytic dehydrogenation of mono- or di-ethyl benzenes in the presence of a new and improved catalyst.

Because of the importance of styrene in the preparation of synthetic rubbers, plastics and resins, considerable research has been directed to various methods for producing this compound and for improving known methods to obtain increased yields of styrene from ethyl benzene. The polymerization of styrene with various co-monomers such as butadiene to produce synthetic rubbers is well known as is the polymerization of styrene to produce polystyrene resins.

The dehydrogenation reaction most usually employed is to pass the alkyl aromatic reactant diluted with 2 to 30 moles of steam per mole of reactant over a dehydrogenation catalyst at a temperature of about 580° C. to 700° C. at a low pressure, e.g., subatmospheric to about 25 p.s.i.g. The class of catalyst found to be most effective for this process is an alkalized iron oxide containing a small amount of another heavy metal oxide more difficultly reducible than iron oxide. The catalyst is usually a potassium carbonate promoted iron oxide (calculated as $Fe_2O_3$) containing a small amount of chromium oxide ($Cr_2O_3$) to improve the stability of the iron oxide. Catalysts containing various ratios of iron oxide, chromium oxide and potassium carbonate have been used. One of the major advantages of these catalysts is that they are auto-regenerative under reaction conditions in the presence of steam. This obviates the necessity of interrupting the process and regenerating the catalysts, such regeneration including the burning of the carbon deposits off the surface of the catalyst particles, which is necessary with other dehydrogenation catalysts. There is, however, over a long period of time, e.g., 250–300 days, a noticeable decline in the activity of the catalyst requiring higher temperatures and pressures than initially used to maintain constant conversion. This decline in activity is noted by a drop in the selectivity (moles of desired product per mole of reactant reacted) while maintaining a constant conversion (percent reactant reacted). The selectivity to desired product of this reaction varies inversely with the conversion. Thus, there is a point at which the sum of the conversion and selectively, commonly referred to as the CSV (conversion-selectivity value) reaches a maximum. Any improvement that increases either the selectivity or conversion without lowering the other results in an increased CSV.

The iron oxide used in catalyst preparation is extremely critical in terms of catalyst performance. The iron oxide employed in catalyst preparation is usually a synthetically produced powdered red, red-brown or black pigment. The red or red-brown pigments are highly pure ferric oxide while the black pigment is the magnetite form-ferrosoferric oxide ($Fe_3O_4$), which is usually the form found in the catalyst under reaction conditions. These oxides are prepared by various methods, e.g., oxidation of iron compounds, roasting, precipitation, calcination, etc. Whatever method is used the final step is usually the application of substantial heat to remove all or substantially all of the water from the oxide, thereby producing an oxide red or red-brown in color. It is known that the most active and selective catalysts are those having an available surface area below 10 square meters per gram and in many cases below 5 square meters per gram. Since iron oxides have surface areas in excess of this requirement many methods have been employed to reduce their available surface area. One of the most common is the precalcination of the iron oxide at a temperature in excess of 700° C. for a period of time ranging from one half hour to several hours. Other methods are involved in catalyst preparation. One method adds Portland cement to the catalytic components followed by calcination at about 600° C. thereby lowering the surface area by plugging pores in the catalyst by cement as well as by calcination. Another method reduces the available surface area by calcination of the catalyst at 800° C. to 950° C.

While most of the above methods result in catalysts having the desired surface area they also result in catalysts having a relatively high density. It has been found that catalysts having a highly porous structure and a low surface area are highly active for the catalytic dehydrogenation of alkyl aromatics such as ethyl benzene. Various methods have been employed in an attempt to form highly porous catalysts. For example, combustible materials such as sawdust, carbon, etc., have been added during catalyst formation and then burned out after the pellet had been formed. Wood flour has also been added to the catalyst mixture and the catalyst has been prepared by adding an excess of water to the mixture before extruding into pellets and then drying. The catalysts formed by these methods often suffer disadvantages in that the pellet crushing strength is low or the catalysts shrink thereby losing any increase that might have been gained in porosity. If too much water is added before catalyst extrusion the paste is too thin to extrude efficiently.

It is an object of this invention to provide a process for the dehydrogenation of alkyl aromatics in the presence of steam by utilizing a new and improved catalyst that substantially eliminates many of the problems mentioned above.

It is also an object of this invention to provide an improved process for the catalytic dehydrogenation of ethyl benzene to styrene utilizing an improved catalyst having a longer catalyst life, and operative at lower temperatures and with less pressure drop across the catalyst bed than has heretofore been possible.

A further object of this invention is to provide a new and improved dehydrogenation catalyst containing alkalized iron oxide wherein the iron oxide used need not be dried or calcined to remove substantially all of the water of hydration prior to catalyst formulation.

An additional object of the invention is to provide an improved process for the preparation of styrene using an improved catalyst having increased porosity thereby allowing better diffusion of gases throughout the catalyst particles.

A still further object of this invention is to provide an improved process for the dehydrogenation of ethyl benzene to styrene utilizing a new potassium promoted iron oxide catalyst whereby the conversion selectivity value (CSV) for the process is improved. Other objects and advantages of the invention will become apparent from the following detailed description thereof.

These objects and their attainment will be better understood from the following description of the invention, which is made in part with reference to the accompanying drawing wherein FIGURES I and II are graphical representations of various relationships between different variables involved in the catalytic dehydrogenation of ethyl benzene to styrene.

It has now been found that substantially improved catalysts particularly effective in catalyzing the dehydrogenation of ethyl benzene to styrene are obtained by using a yellow iron oxide as a starting material in catalyst preparation instead of the red or red-brown iron oxide usually used in preparing iron oxide-chromium oxide-potassium carbonate dehydrogenation catalysts.

In its broad aspect this invention relates to novel dehydrogenation catalysts prepared by combining a yellow iron oxide, chromium oxide and potassium carbonate and to the method of using these catalysts in the catalytic dehydrogenation of alkyl aromatics to vinyl aromatics.

In accordance with the present invention, ethyl benzene is converted to styrene by contacting ethyl benzene and steam in a molar ratio of about 1:2 to about 1:20 with a dehydrogenation catalyst described hereinafter at a temperature of from about 500° to about 700° C. The catalyst contains from about 80 to 90 percent by weight iron oxide, a potassium compound equivalent to 9 to 18 percent by weight potassium carbonate and 1.5 to 5 percent by weight chromium oxide and is prepared by combining yellow iron oxide, chromium oxide, potassium carbonate and water to form a paste, extruding the paste to form pellets, drying the pellets and calcining them at a temperature ranging from about 800° to 1000° C.

The calcination is necessary for development of pellet strength. During calcination the potassium carbonate is converted to potassium oxide ($K_2$). However, during use, carbon dioxide is absorbed from the reaction gases and the potassium is again present as the carbonate.

While it is not known just what effect the yellow iron oxide has upon the catalyst that makes it different from prior art catalysts of the same elemental composition, it is known, as will be demonstrated, that the catalyst prepared from yellow iron oxide produces superior results in the dehydrogenation of ethyl benzene to styrene.

Yellow iron oxide appears in a variety of colors ranging from a light yellow to a deep yellow-orange. The yellow iron oxides are the hydrated form of ferric oxide and are substantially monohydrates. The water content is usually about 13 percent by weight. They may be prepared by the controlled oxidation of iron in ferrous sulfate solutions such as disclosed in U.S. Patent 2,111,726, to G. Plews and dated Mar. 22, 1938.

While not wishing to be limited to any theory as to what makes the catalysts prepared from yellow iron oxide superior to those of the prior art, it is believed that the water of hydration may have a significant effect. It is thought that in drying the catalyst after extrusion, the water added to mix the catalyst components leaves much more readily than the water of hydration of the iron oxide. Upon additional heating or calcining, the water of hydration is driven off resulting in a catalyst of increased porosity thereby allowing greater diffusion of the gaseous reactant throughout the catalyst particle.

The manner in which the catalysts are prepared is not extremely critical and depends to a large extent upon the composition of the catalyst being prepared. For catalysts containing a relatively low potassium carbonate content, say about 13.5 percent by weight, the potassium carbonate is dissolved in a small amount of water and the solution is thoroughly mixed with powdered yellow iron oxide and chromium oxide to form a paste. The paste is extruded and pelleted. The pellets are pan dried at about 175° to 235° C. for about one hour and subsequently calcined for about ½ to 2 hours at about 800° to 1000° C. The amount of water added to form a paste is much more critical when using yellow iron oxide than with the red iron oxides due to the water of hydration. If too much water is added, the paste will be too thin and extrusion into pellets or formation of tablets difficult. Calcination of the catalyst is necessary to strengthen it and to reduce the available surface area to the desired limits which is usually below 5 square meters per gram and is preferably below 3 square meters per gram for the catalysts of this invention.

The percentages of catalytic components may vary slightly within the scope of the invention. As stated before, catalysts containing from 80 to 90 percent by weight iron oxide, calculated as $Fe_2O_3$, a potassium compound equivalent to 9 to 18 percent by weight potassium carbonate and 1.5 to 5.0 percent by weight chromium oxide calculated as $Cr_2O_3$ are preferred. Catalysts made from 84 percent by weight iron oxide, 13.5 percent by weight potassium carbonate and 2.5 percent by weight chromium oxide have been found especially useful.

The weight percentages of yellow iron oxide and potassium carbonate are especially critical in controlling the physical features of the catalyst produced. If the potassium content rises substantially above the preferred amount resulting in a corresponding reduction of iron oxide, the catalyst has a much higher density, larger surface area and small pore volume.

The size of the pellets produced may vary, catalysts having a diameter of from ⅛ to ¼ inch and from ⅛ to ⅝ inch in length being the most common. The small diameter catalysts are more active but are not as strong. Generally speaking, catalysts having a diameter of ³⁄₁₆ of an inch are usually employed.

It is preferable that the catalyst contain only iron oxide, potassium carbonate and chromium oxide as mentioned above. However, if desired, one may include other additives such as phosphates, silica, cement, etc., without departing from the scope of the invention.

The reactant feed may consist of anywhere from 2 to 20 moles of steam for every mole of ethyl benzene. The catalyst having higher potassium contents are usually operable at lower ethyl benzene to steam ratios. Generally speaking, a feed containing about two parts by weight of steam to one part of ethyl benzene have been found satisfactory. This results in an ethyl benzene to steam molar ratio of about 1:12.

The dehydrogenation is usually carried out at a reaction temperature of about 500° to 700° C. with temperatures of about 550° to 650° C. being preferred. One of the advantages of this invention is that operation of the dehydrogenation reaction over long periods of time is possible without as great an increase in temperature with respect to catalyst age as is necessary using prior art catalysts.

The use of atmospheric, subatmospheric or superatmospheric pressure broadly is comprised within the scope of this invention. However, it is preferable to operate at as low a pressure as is feasible and essentially atmospheric pressure is preferred. As the reaction proceeds over long periods of time a pressure drop occurs across the catalyst bed due to the necessity of utilizing higher inlet pressures to force the gaseous reactant through the catalyst bed. Although the increase in pressure is not great and may amount to only a few pounds per square inch, it is sufficient to alter the activity of the catalyst and decrease the selectivity of the converted reactant to the desired product. A distinct advantage of the present invention is that pressure drops across the catalyst bed over long periods of time are less than pressure drops noted with prior art catalysts.

The process of the invention may be carried out in batch, semicontinuous or continuous operation with continuous operation being preferred. The catalyst may be employed in the form of a fixed bed, or in fluidized or suspended form. It is preferable to utilize a fixed bed. The reaction may be carried out in single stage reactors or by dual staging in series reactors. The reactors may be of various designs, for example, downflow reactors, radial flow reactors, etc., may be used.

The contact time of the reactant gas with the catalyst is usually defined in terms of space velocity (volumes of hydrocarbon reactant per volume of catalyst per hour, i.e., GHSV). The GHSV according to the invention may vary from about 100 to 3000 and is preferably adjusted within this range to effect the degree of conversion desired for the particular feed in question.

The following examples are illustrative of the invention. While differences may at first seem small, it must be kept in mind that advantages resulting in increasing the CSV of a process only one or two points are very significant in a commercial process, many of which produce several hundred thousand pounds of styrene a day. One of the most significant advantages of this invention is the increase in catalyst life thereby resulting in higher yields and selectivities to styrene after months of catalyst operation.

*Example I*

This example is typical of the method used in making the catalysts of this invention. A mixture consisting of 500 pounds of yellow iron oxide (87% $Fe_2O_3$·13% water) and 12.4 pounds of chromium oxide was added to a solution consisting of 72.5 pounds of potassium carbonate dissolved in water to form a new mixture. Enough water was added to this new mixture to form a paste of the proper consistency which paste was extruded through 3/16" dies and cut into pellets about 1/8 to 5/8" in length. The pellets were dried in a pan drier for about one hour at a temperature of 175–230° C. and then placed in an oven and calcined for about 1/2–2 hours at a temperature of about 925° C. The resulting catalyst had a weight composition of 88 percent iron oxide, 9.5 percent potassium oxide, and 2.5 percent chromium oxide. In use the potassium oxide becomes converted to carbonate and the weight composition becomes 84% $Fe_2O_3$, 13.5% $K_2CO_3$, and 2.5% $Cr_2O_3$.

*Example II*

The catalyst prepared according to Example I was compared with similar catalysts prepared by the same process using a red iron oxide in the place of the yellow iron oxide. The results of the comparison appear in the following table.

TABLE I

|  | Red Oxide | Yellow Oxide |
| --- | --- | --- |
| Surface Area, m.²/g | 2.2 | 1.5 |
| Particle Density, g./cc | 2.470 | 2.256 |
| Pore Volume, cc./g | 0.168 | 0.198 |
| Crushing Strength, lbs | 31 | 23 |

It is to be noted that with the yellow oxide catalyst the pore volume varies inversely with the surface area. In view of this, it is surprising that the increase in pore volume of the yellow oxide catalyst over the red oxide catalyst occurs mostly in the 1000 to 3000 A. range.

*Example III*

FIGURE I compares the conversion vs. selectivity of three different catalysts. All catalysts contained 84 percent by weight iron oxide, 13.5 percent by weight potassium carbonate and 2.5 percent by weight chromium oxide. Catalyst A was 3/16" in diameter and was prepared from yellow iron oxide. Catalysts B and C were prepared from red iron oxide and had diameters of 1/8" and 1/4" respectively. The results were obtained from a commercial size reactor fed by ethyl benzene at the rate of 120 GHSV. The molar ratio of steam to ethyl benzene in the feed was about 12 to 1. The temperatures used varied over the range required to attain conversions given in FIGURE I.

At low conversions there is very little difference among the three catalysts. As the conversion rises the selectivity drops off as is to be expected with this type of catalyst; however, the decline in selectivity is much more pronounced with the red iron oxide catalysts B and C than with yellow iron oxide catalyst A. It is known that the activity of these catalysts increases as catalyst diameter decreases, therefore, one would expect the curve for catalyst A to be between those catalysts B and C. Surprisingly, the activity of the yellow oxide 3/16" catalyst is even superior to that of the smaller red oxide 1/8" catalyst.

*Example IV*

In order to show the superiority of the yellow iron oxide catalysts over those commonly used in the prior art on a full scale commercial size run, two identical reactors were charged with catalysts identical in composition and diameter. Catalyst A, charged to one reactor, was prepared from a yellow iron oxide and catalyst B, charged to the other reactor, was prepared from a red iron oxide. Both catalysts were 3/16" in diameter and contained the same weight percentages as those of Example III. Ethyl benzene was fed to each of the reactors at the rate of 120 GHSV and the molar ratio of steam to ethyl benzene was about 12 to 1.

Both reactors were operated under conditions required to keep the ethyl benzene conversion constant at about 50 percent. The inlet pressure of the catalyst A reactor was 14.2 p.s.i. and the inlet pressure of catalyst B reactor was 14.5 p.s.i. at the beginning of the run. The reaction temperatures at the beginning of the run were 551° C. for the catalyst A reactor and 560° C. for catalyst B reactor.

The CS value for both reactors was similar for about the first 200 days, as illustrated by FIGURE II; however, the temperature and pressure required to maintain 50 percent conversion in the catalyst B reactor had risen during that period. After 250 days of operation there was a noticeable decline in the selectivity of catalyst B and the inlet pressure and reaction temperature had risen to 20.5 p.s.i. and 580° C. respectively. At the same time the inlet pressure required by the catalyst A reactor had risen to only 18 p.s.i. and the reaction temperature had remained constant at 551° C. The selectivity to styrene using catalyst B declined more rapidly, as illustrated by FIGURE II, than that when using catalyst A, thereby indicating a longer catalyst life for catalyst A.

This example illustrates many of the advantages of the yellow iron oxide catalyst over the red iron oxide catalyst now in use. Some of the advantages illustrated herein are higher selectivity over longer periods of time, longer catalyst life, lower operating temperatures and lower pressure drop across the catalyst bed.

*Example V*

In order to illustrate the economic importance of small differences in catalytic activity of various catalysts in a commercial operation, the following tabulations were made as recorded in Table II. The results are reported as differences in cost per pound of finished styrene using the yellow iron oxide catalyst as a base. The CS values are not necessarily the best that can be attained with the particular catalyst used but are the values attained in the most economical operation in terms of cost per pound of styrene. The catalysts used contained 84 percent by weight iron oxide, 13.5 percent by weight potassium carbonate and 2.5 percent by weight chromium oxide. The designation Red and Yellow refer to the iron oxide used in catalyst preparation.

TABLE II

| Diameter and type of catalyst | CSV at optimum cost | Diff. in cost/lb. finished styrene, cents |
| --- | --- | --- |
| ¼″ Red | 132 | 0.06 |
| 3/16″ Red | 134 | 0.03 |
| 3/16″ Yellow | 145 | 0.00 |

It is readily seen from the above table that at optimum cost the yellow iron oxide catalyst operates at a much higher efficiency (CSV) than the red iron oxide catalysts. Moreover, in an average commercial plant operation producing several million pounds of styrene every month, a catalyst resulting in a difference of cost as illustrated above results in a saving of from about 50 to 100 thousand dollars a year.

We claim as our invention:

1. In a process for the dehydrogenation of an alkyl aromatic to a vinyl aromatic comprising contacting the alkyl aromatic and steam in a molar ratio of about 1:2 to about 1:20 with a catalyst containing about 80 to 90 percent by weight iron oxide, 9 to 18 percent by weight potassium carbonate and 1.5 to 5 percent by weight chromium oxide at a temperature of from about 500° to 700° C., the improvement which comprises using a catalyst prepared by combining a yellow iron oxide, chromium oxide, potassium carbonate and water to form a paste, extruding the paste to form pellets, drying the pellets and calcining them at a temperature ranging from about 800° to 1000° C.

2. In a process for the dehydrogenation of ethyl benzene to styrene comprising contacting ethyl benzene and steam in a molar ratio of about 1:2 to 1:20 with a catalyst containing about 80 to 90 percent by weight iron oxide, 9 to 18 percent by weight potassium carbonate and 1.5 to 5 percent by weight chromium oxide at a temperature of from about 500° to 700° C., the improvement which comprises using a catalyst prepared by combining a yellow iron oxide, chromium oxide, potassium carbonate and water to form a paste, extruding the paste to form pellets, drying the pellets and calcining them at a temperature ranging from 800° C. to 1000° C.

3. A process according to claim 2 wherein the yellow iron oxide used in catalyst preparation is the monohydrated yellow iron oxide.

4. A process according to claim 2 wherein the yellow iron oxide used in catalyst preparation is the monohydrated yellow iron oxide containing about 13 percent by weight water of hydration.

5. In a process for the dehydrogenation of ethyl benzene to styrene comprising contacting ethyl benzene and steam in a molar ratio of about 1:2 to 1:20 with a catalyst containing about 84 percent by weight iron oxide, 13.5 percent by weight potassium carbonate and 2.5 percent by weight chromium oxide at a temperature of from about 550° to 650° C., the improvement which comprises using a catalyst prepared by combining mono- hydrated yellow iron oxide, chromium oxide, potassium carbonate and water to form a paste, extruding the paste to form pellets, drying the pellets and calcining them at a temperature ranging from about 800° to about 1000° C.

6. A process according to claim 5 wherein the yellow iron oxide used in catalyst preparation is yellow monohydrated ferric oxide.

7. A process according to claim 5 wherein the yellow iron oxide used in catalyst preparation is the yellow mono-hydrated iron oxide containing about 13 percent by weight water of hydration.

8. A dehydrogenation catalyst containing 80 to 90 percent by weight iron oxide, 9 to 18 percent by weight potassium carbonate and 1.5 to 5 percent by weight chromium oxide prepared by combining yellow monohydrated iron oxide, chromium oxide, potassium carbonate and water to form a paste, extruding the paste into pellets, drying the pellets and calcining them at a temperature ranging from about 800° to about 1000° C.

9. A catalyst according to claim 8 wherein the yellow iron oxide used in catalyst preparation is yellow monohydrated ferric oxide.

10. A catalyst according to claim 8 wherein the yellow iron oxide used in catalyst preparation is yellow monohydrated ferric oxide containing about 13 percent by weight water of hydration.

References Cited
UNITED STATES PATENTS

| | | | |
| --- | --- | --- | --- |
| 2,939,767 | 6/1960 | Martin | 23—200 |
| 2,990,432 | 6/1961 | Fleming et al. | 260—669 |
| 3,082,067 | 3/1963 | Hund | 23—200 |
| 3,084,125 | 4/1963 | Soderquist et al. | 260—669 X |

PAUL M. COUGHLAN, JR., *Primary Examiner.*

DELBERT E. GANTZ, C. R. DAVIS, *Examiners.*